(12) United States Patent
Sharma et al.

(10) Patent No.: US 10,115,236 B2
(45) Date of Patent: Oct. 30, 2018

(54) PLACING AND PRESENTING VIRTUAL OBJECTS IN AN AUGMENTED REALITY ENVIRONMENT

(71) Applicant: Verizon Patent and Licensing Inc., Arlington, VA (US)

(72) Inventors: Manish Sharma, San Jose, CA (US); Anand Prakash, San Jose, CA (US); Devin Blong, Penngrove, CA (US); Qing Zhang, Cupertino, CA (US); Chetan Mugur Nagaraj, Fremont, CA (US); Srivatsan Rangarajan, Fremont, CA (US); Eric Miller, Scotts Valley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 15/271,409

(22) Filed: Sep. 21, 2016

(65) Prior Publication Data
US 2018/0082475 A1     Mar. 22, 2018

(51) Int. Cl.
| G06T 19/00 | (2011.01) |
| G06K 9/52 | (2006.01) |
| G06K 9/46 | (2006.01) |
| G06T 7/60 | (2017.01) |
| G09G 5/00 | (2006.01) |
| G06K 9/62 | (2006.01) |
| G06T 7/00 | (2017.01) |

(52) U.S. Cl.
CPC .......... *G06T 19/006* (2013.01); *G06K 9/4604* (2013.01); *G06K 9/52* (2013.01); *G06K 9/6215* (2013.01); *G06T 7/0044* (2013.01); *G06T 7/0085* (2013.01); *G06T 7/60* (2013.01); *G09G 5/006* (2013.01); *G09G 2370/16* (2013.01)

(58) Field of Classification Search
CPC ............ G06K 9/52; G06T 7/60; G06T 19/006
See application file for complete search history.

(56) References Cited

U.S. PATENT DOCUMENTS

| 8,922,590 B1* | 12/2014 | Luckett, Jr. ............ G09G 5/377 345/633 |
| 9,342,928 B2* | 5/2016 | Rasane ................. G06T 19/006 |
| 2008/0247663 A1* | 10/2008 | Jacobsen ........... G06F 17/30805 382/266 |

(Continued)

*Primary Examiner* — Kee M Tung
*Assistant Examiner* — Grace Q Li

(57) ABSTRACT

Systems described herein allow for placement and presentation of virtual objects using mobile devices with a single camera lens. A device receives, from a first mobile device, a target image captured from a camera and target image data collected contemporaneously with the target image. The target image data includes a geographic location, a direction heading, and a tilt. The device receives, from the first mobile device, a first virtual object definition that includes an object type, a size, and a mobile device orientation for presenting a first virtual object within a video feed. The device generates a simplified model of the target image, and stores the first virtual object definition associated with the target image data and the simplified model of the target image. The device uploads the first virtual object definition and the target image data, so the first virtual object is discoverable by a second mobile device.

17 Claims, 13 Drawing Sheets

(56) References Cited

U.S. PATENT DOCUMENTS

| | | | | |
|---|---|---|---|---|
| 2012/0115513 | A1* | 5/2012 | Han | G06T 19/006 455/456.3 |
| 2014/0152698 | A1* | 6/2014 | Kim | G06T 19/006 345/633 |
| 2014/0368498 | A1* | 12/2014 | Wei | G06T 17/205 345/420 |
| 2014/0368537 | A1* | 12/2014 | Salter | G06T 19/006 345/633 |
| 2015/0052458 | A1* | 2/2015 | Rothenberger | G06F 3/04815 715/757 |
| 2017/0336941 | A1* | 11/2017 | Gribetz | G06F 3/04815 |
| 2017/0365231 | A1* | 12/2017 | Rider | G09G 5/006 |

* cited by examiner

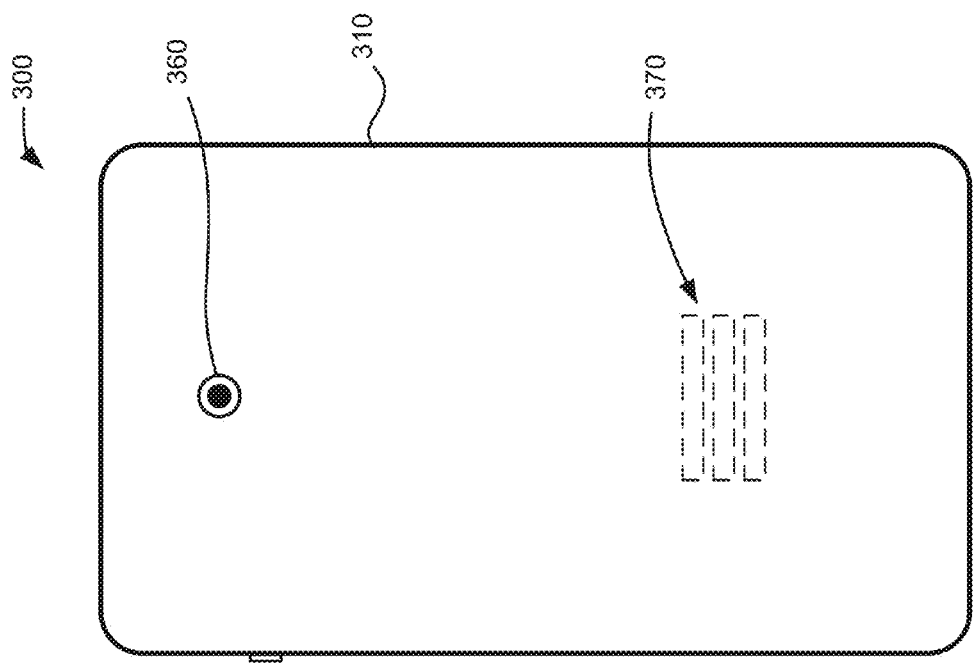
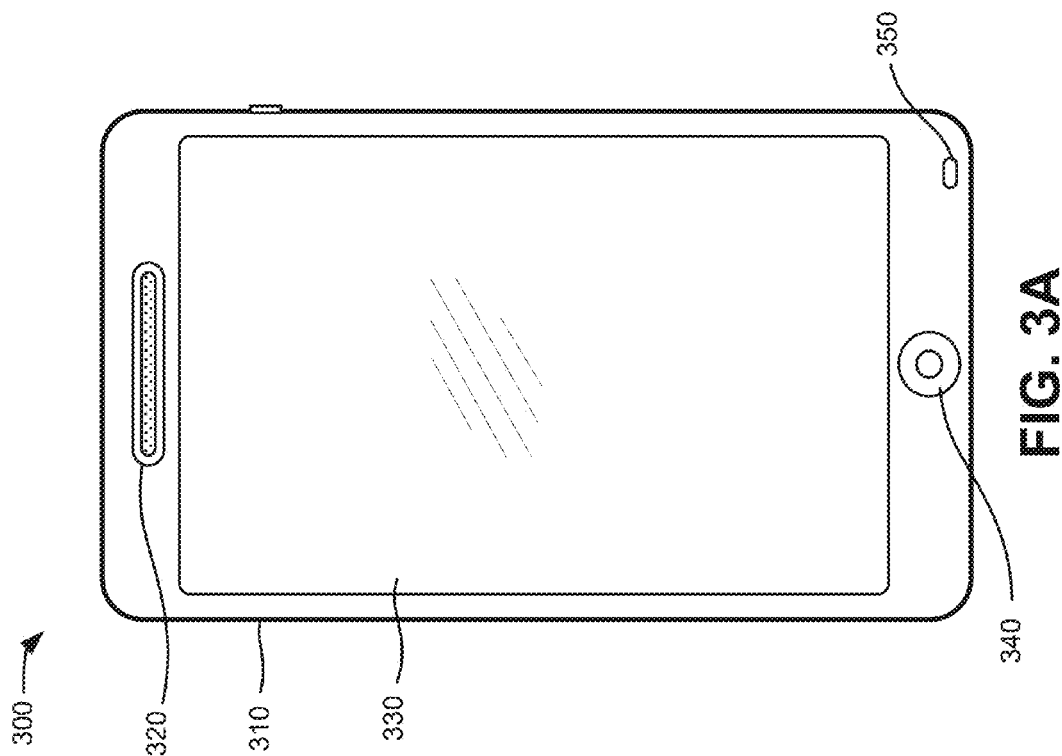

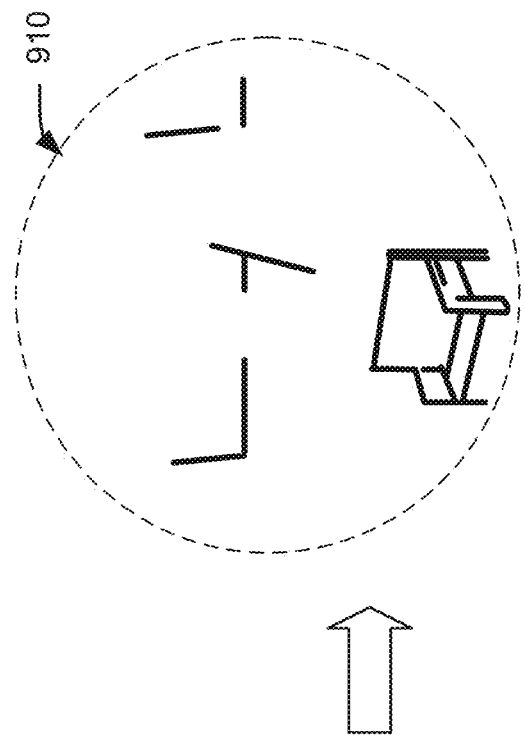
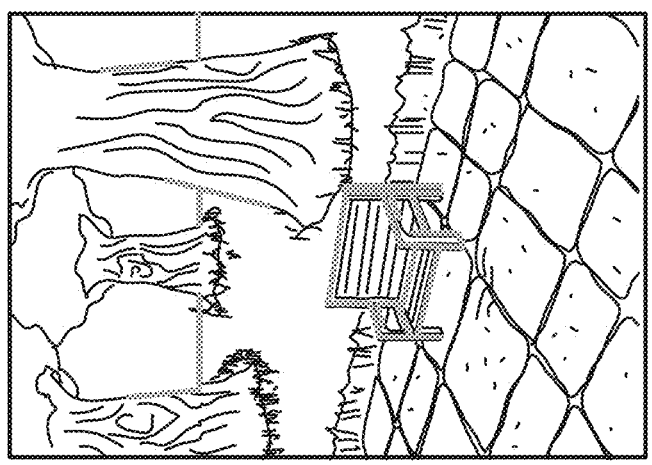
FIG. 9A

PLACING AND PRESENTING VIRTUAL OBJECTS IN AN AUGMENTED REALITY ENVIRONMENT

BACKGROUND

Augmented reality refers to the live direct or indirect view of a physical, real-world environment. Augmented reality technology can enhance a user's current perception of reality by supplementing elements of the real-world environment with computer-generated elements such as graphics, video, sound, geographic location data, etc. One challenge when inserting visual computer-generated elements into real-world images is to consistently present the virtual object from a perspective that appears authentic to the user.

BRIEF DESCRIPTION OF THE DRAWINGS

FIGS. 3A and 3B are diagrams of front and rear views, respectively, of the mobile device of FIG. 1, according to an implementation described herein;

FIGS. 9A and 9B are diagrams illustrating generating and applying a simplified edge model;

DETAILED DESCRIPTION OF THE PREFERRED EMBODIMENTS

The following detailed description refers to the accompanying drawings. The same reference numbers in different drawings may identify the same or similar elements.

Systems and methods described herein apply visual computer-generated elements into real-world images by using information available in conventional mobile devices, such as smart phones. More particularly, the systems and methods described herein use information from common smart phone technology (e.g., a single rear-facing camera, a gyroscope, a magnetometer/compass, an accelerometer, and a location-detection system) to render virtual objects within real-world image feeds and replicate the virtual objects for other users.

Previous attempts to apply virtual objects with depth perspective have required multiple cameras and other sensors to accurately identify an environment and render the virtual objects with the appearance of occupying three-dimensional space. For example, a typical augmented reality system may require information from a deep focus camera, a shallow focus camera, and an infrared sensor. However, most mobile consumer devices are not equipped with such technology, and the addition of these features can drive up the price of the mobile consumer devices.

Figure 1:
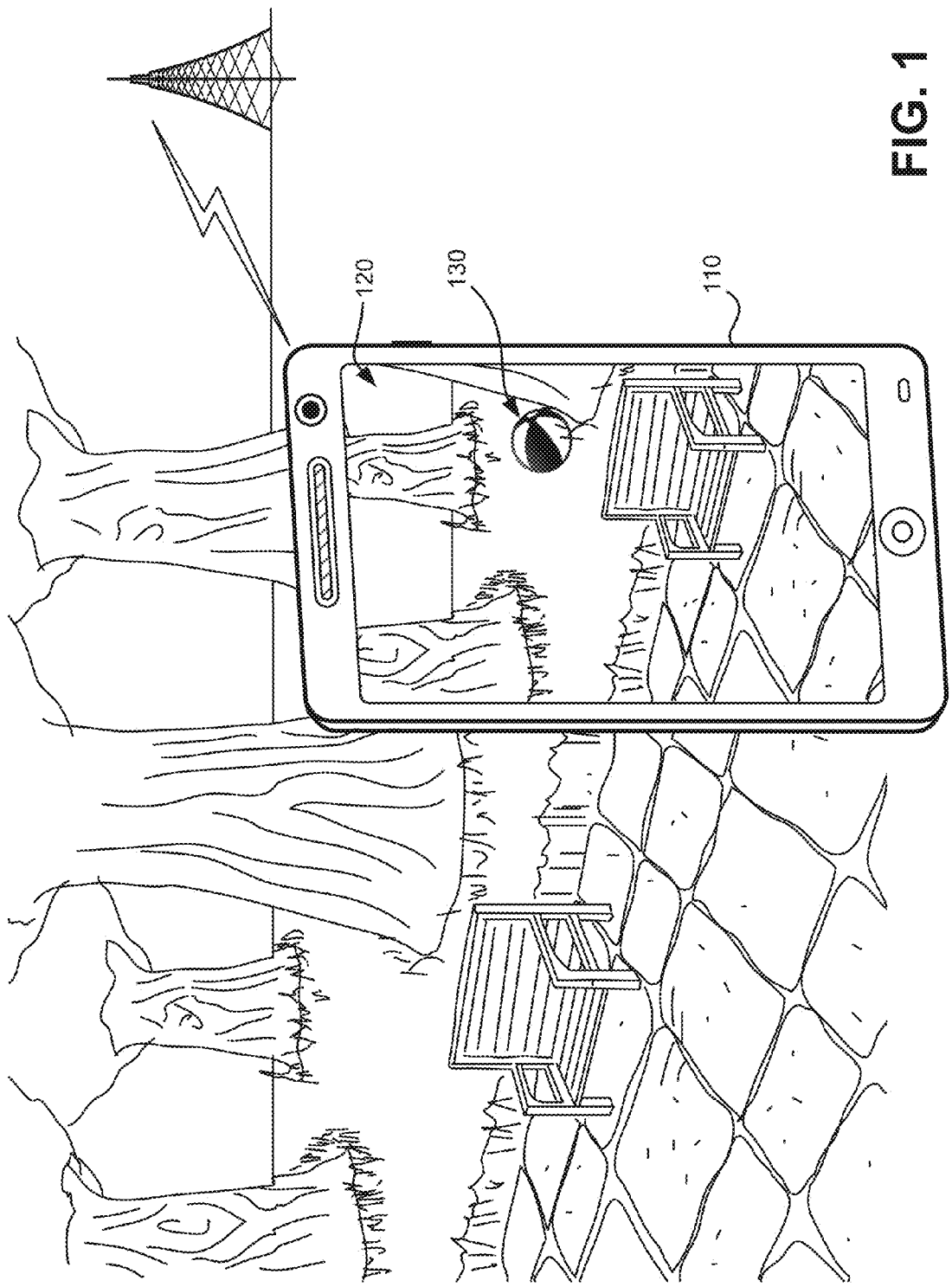
FIG. 1 is a diagram illustrating concepts described herein.

FIG. 1 is a diagram illustrating an implementation described herein. A mobile device 110 (e.g., smart phone, a tablet computer, etc.) may be equipped with an augmented reality (AR) application. Mobile device 110 may use the AR application to capture an image 120 of a real-world environment. The AR application may store image 120 and record a geographic location (or "geo-location"), direction heading, tilt, etc. of mobile device 110 at the time of capturing image 120. Image 120 may be referred to as a "target image," and the geographic location, direction heading, tilt, etc. of mobile device 110 may generally be referred to as "target image data." Target image 120, along with the target image data, may serve as a point of reference for an AR sphere. When at the location of the reference point, a user of mobile device 110 may use the AR application to insert a virtual object 130 into the AR sphere. The user may define an object type, a size, a virtual location, and/or other features of the virtual object within the AR sphere. The object type, size, virtual location, and other features may be referred to as an "object definition."

The target image, target image data, and object definition may be provided to a backend system. The backend system may store the target image, target image data, and object definition and may generate a simplified model of the target image. Another mobile device with the AR application may later be positioned in the same position (also referred to herein as a reference position) indicated in the target image data. When approximate to the reference position, the other mobile device may provide a video feed, and the backend system may use the simplified model of the target image to detect a match between an image from the video feed and the simplified model, when the mobile device obtains the reference position. When the match is detected, the augmented reality space is unlocked and the other mobile device may be instructed to present the virtual object according to the object definition. As described further herein, once mobile device 110 is established in the reference position, other virtual objects may be placed (and later discovered) in an augmented reality sphere that is defined relative to the reference position.

Figure 2:
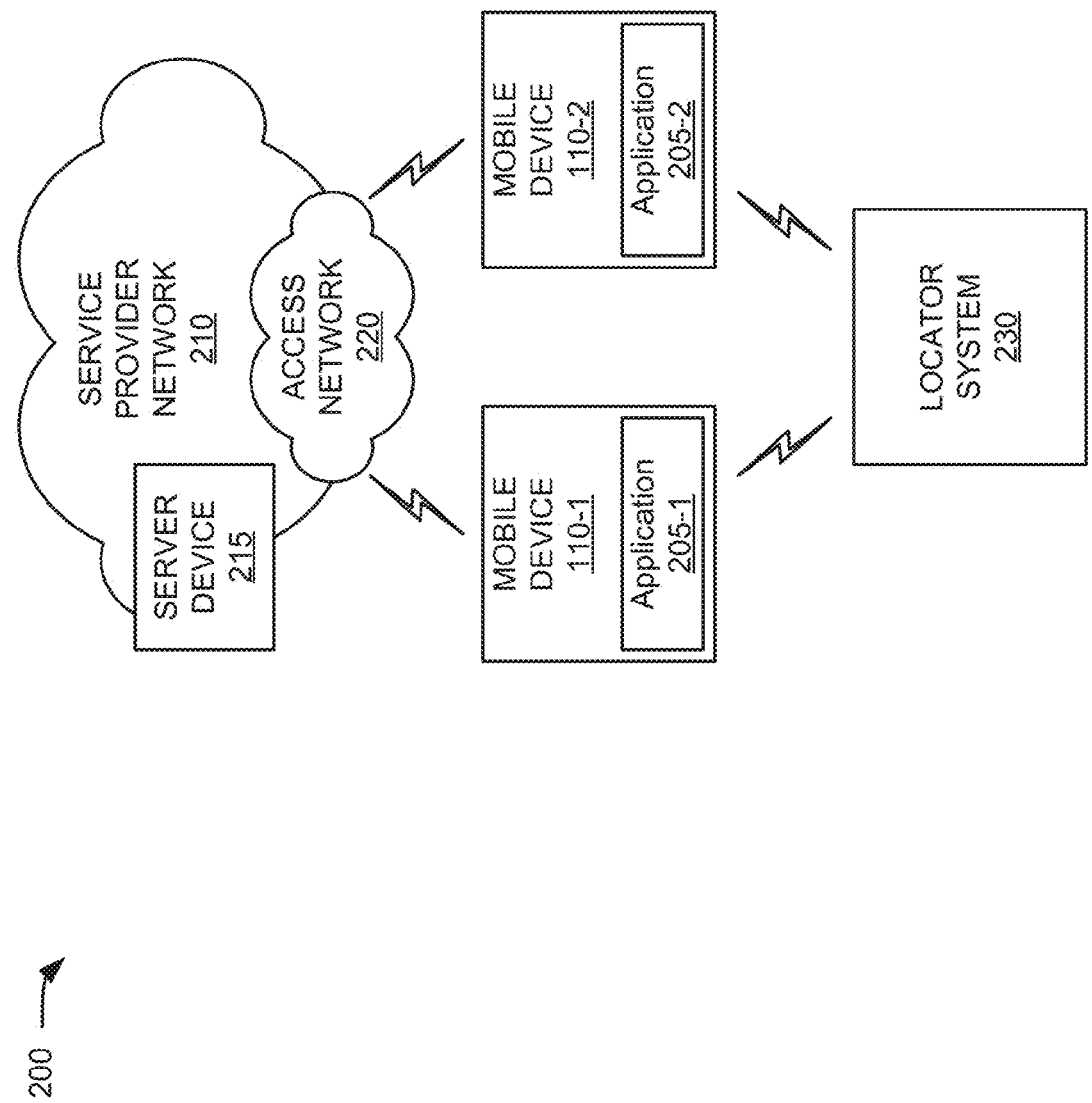
FIG. 2 is a diagram that depicts an exemplary network environment in which systems and methods described herein may be implemented.

FIG. 2 is a diagram illustrating an exemplary network environment 200 in which systems and methods described herein may be implemented. As illustrated, network environment 200 may include mobile devices 110-1 and 110-2 (referred to generically as "mobile device 110" and collectively as "mobile devices 110"), a service provider network 210 including a server device 215, an access network 220, and a locator system 230. Components of network environment 200 may be connected via wired and/or wireless links.

Mobile device 110 may include a portable communication device (e.g., a mobile phone, a smart phone, a tablet device, a global positioning system (GPS) device, and/or another type of wireless device); a laptop (e.g., with a wireless air card) or another type of portable computer; a portable gaming system; and/or any other type of mobile computer device with communication and output capabilities. In one implementation, mobile device 110 may include a camera and one or more sensors to capture additional information regarding a user or a surrounding environment of mobile device 110. For example, mobile device 110 may include a location sensor, such as a sensor to receive a GPS or other location data, or a component to dynamically determine a location of mobile device 110. As another example, mobile device 110 may include an accelerometer, compass, gyroscope, etc.

Mobile device 110 may operate according to one or more wireless communication standards such as broadband cellular standards (e.g., long-term evolution (LTE) network, wideband code division multiple access (WCDMA), etc.), local wireless standards (e.g., Wi-Fi®, Bluetooth®, near-field communications (NFC), etc.), or according to other communications standards.

In one implementation, mobile device 110 may be provided with one or more applications 205-1 and 205-2 (e.g., an AR application, referred to generically as "AR application 205") to generate and present virtual objects in a reality image. AR application 205 is described further in connection with, for example, FIG. 5.

Service provider network 210 may include network devices that provide telecommunications services and provide a backend system for supporting features of mobile devices 110. Service provider network 210 may include a local area network (LAN), an intranet, a private wide area network (WAN), a telephone network, such as the Public Switched Telephone Network (PSTN), a metropolitan area network (MAN), a public network, a mobile access network, a mesh network, a fiber-optics network (e.g., passive optical networks (PONS)), or a combination of networks. Service provider network 210 may include, for example, one or more private Internet Protocol (IP) networks that use a private IP address space. Although shown as a single element in FIG. 2, service provider network 210 may include a number of separate networks. Service provider network 210 may permit mobile devices 110 to download applications (e.g., AR application 205) and transfer data (e.g., target images, target image data, and object definitions) to support augmented reality services.

According to an implementation, service provider network 210 may include a mobile access network 220 that transfers/receives information (e.g., voice, data, broadband applications, etc.) to/from a circuit-switched and/or packet-switched network. As an example, mobile access network 220 may include an LTE network, a Code Division Multiple Access (CDMA) network, a Wi-Fi network (e.g., using IEEE 802.11 standards), or another access network (e.g., an E-UTRAN, an enhanced high-rate packet data (eHRPD) network, or another 3G, 4G, or future wireless network standard).

Server device 215 (also referred to as "server 215") may include a network or computing device. Server device 215 may provide backend processing to support functions of AR application 205, such as placement of virtual objects and presentation of virtual objects. For example, server device 215 may receive a target image captured from a camera on mobile device 110-1, along with mobile device data (e.g., a geo-location, a direction heading, and a tilt indication) collected contemporaneously with the target image. Server device 215 may generate a simplified model of the target image using, for example, edge detection techniques. Server device 215 may receive a virtual object definition from a mobile device that includes an object type, a size, and a virtual location of the virtual object within an AR sphere. In one implementation, server device 215 may store the virtual object definition associated with the target image data and the simplified model of the target image. Some or all of the stored virtual object definition, the target image data and/or the simplified model may be accessible to other mobile devices using AR application 205.

Server device 215 may also receive, from mobile device 110-2, a video feed when mobile device 110-2 is in the same position as mobile device 110-1 was when the target image was created. Server device 215 may detect a match between an image from the video feed and the simplified model, and may instruct mobile device 110-2 to present the virtual object when the match is detected.

Locator system 230 may include a satellite global positioning system (GPS), a cellular tower triangulation system, a WLAN access point locating system, a global navigation satellite system (GNSS), or another system that determines real-time (or near real-time) location information for subscribing devices, such as mobile device 110. In one implementation, locator system 230 may include a satellite to broadcast information to mobile device 110. In another implementation locator system 230 may include one or more other systems (e.g., a location information server) to gather/provide information about the position, direction, and/or destination of mobile device 110.

In FIG. 2, the particular arrangement and number of components of network environment 200 are illustrated for simplicity. In practice there may be more mobile devices 110, service provider networks 210, server devices 215, access networks 220, and locator systems 230. For example, there may be millions of mobile devices 110.

FIGS. 3A and 3B show an exemplary communications device 300 that may correspond to mobile device 110. FIGS. 3A and 3B include a front view and back view, respectively, of communications device 300. As shown in FIGS. 3A and 3B, communications device 300 may include a housing 310, a speaker 320, a display screen 330, control button(s) 340, a microphone 350, camera element 360, and/or sensors 370.

Housing 310 may include a chassis via which some or all of the components of communications device 300 are mechanically secured and/or covered. Speaker 320 may include a component to receive input signals from communications device 300 and transmit audio output signals, which communicate audible information to a user of communications device 300.

Display screen 330 may include a component to receive input signals and present a visual output in the form of text, images, videos and/or combinations of text, images, and/or videos. In one implementation, display screen 330 may selectively present a reality image (e.g., image 120), an augmented reality image (e.g., image 120 with virtual object 130) and/or present a user interface to create a virtual object. In one implementation, display screen 330 may correspond to a touch screen that includes a component to detect an input. For example, display screen 330 may include a pressure sensor to detect touch for inputting content to touch screen 330. Alternatively or additionally, display screen 330 may include a capacitive or field sensor to detect a touch or proximity of the user or an input device to display screen 330.

Control buttons 340 may include one or more buttons that accept or otherwise detect an input from the user (e.g., the user presses a control button or combinations of control buttons) and send electrical signals to a processor (not shown) that may cause communications device 300 to perform one or more operations. For example, control buttons 340 may be used to cause communications device 300 to perform operations related to closing an application or switching between applications being executed on communications device 300. Microphone 350 may include a component to receive audible information from a user and send, as output, a signal transmitted to another user device, or cause the device to perform one or more operations.

Camera element 360 may include a component to receive, as input, optical signals and send, as output, a digital image or video that can be, for example, viewed on display screen 330, stored in the memory of communications device 300, discarded and/or transmitted to another communications device 300. Camera element 360 may include a rear-facing lens on a back side of communications device 300 (i.e., facing an opposite direction to display screen 330) and, optionally, another camera lens may be provided on a front side of communications device 300. In one implementation, camera element 360 may capture image data, and communication device 300 may identify its location based on the captured image data.

Sensors 370 may include any types of sensors used to provide information of mobile device 110 (e.g., contemporaneously with collection of optical signals by camera element 360). Sensors 370 may include, for example, rotation sensors (e.g., a gyroscope that detects roll, pitch, and yaw), motion sensors (e.g., an accelerometer), and/or magnetic field sensors (e.g., a magnetometer). Data from sensors 370 may be associated with a new target image or used to identify an existing target image. For example, data from sensors 370 may be collected when a user selects a target image 120 or inserts a virtual object 130. Additionally, data from sensors 370 may be applied to help identify when new images match a target image.

Figure 4:
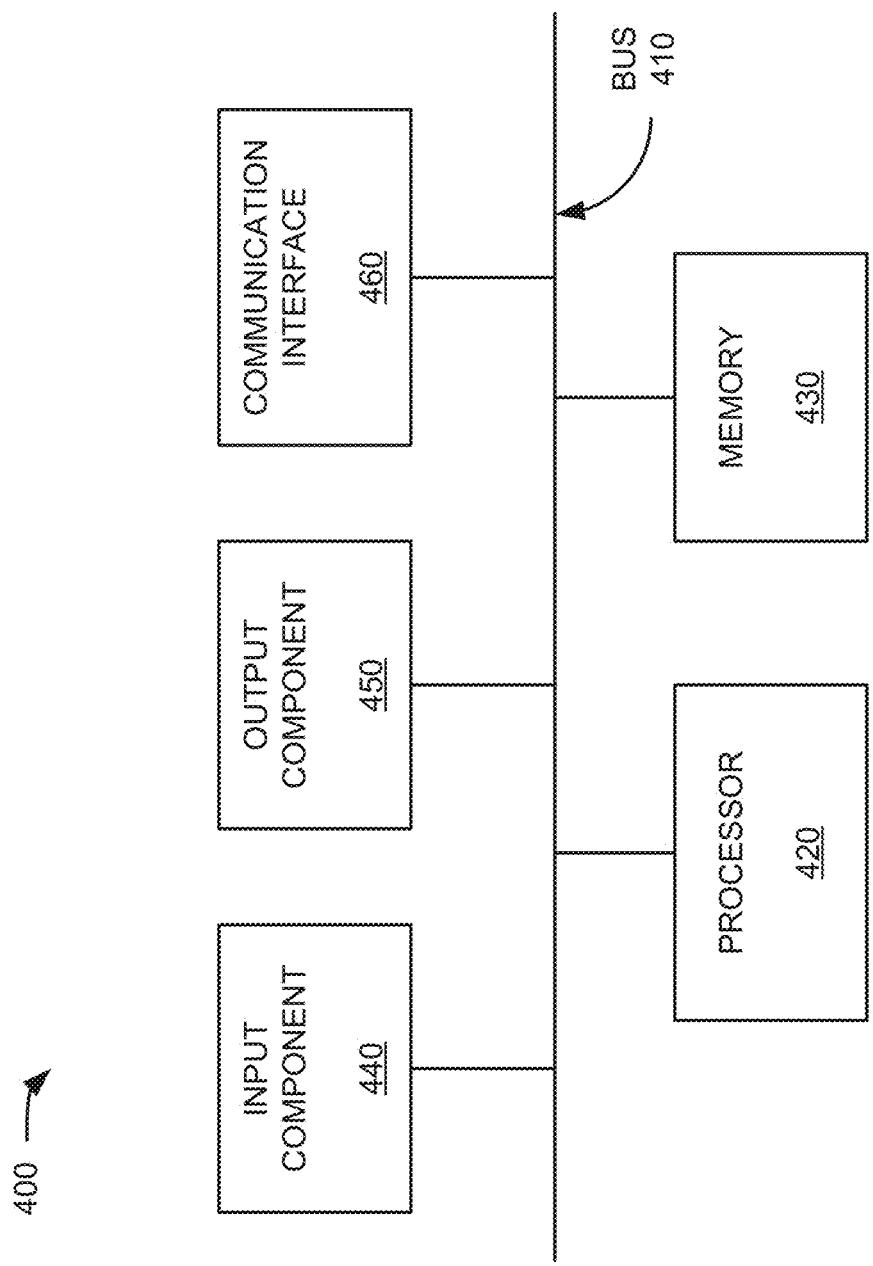
FIG. 4 shows a diagram of exemplary components that may be included in a device included in the network environment shown in FIG. 1.

FIG. 4 is a diagram illustrating exemplary components of a device 400. Device 400 may correspond, for example, to a component of mobile device 110, server device 215, or another device in network environment 200. Alternatively or additionally, mobile device 110, server device 215, or the other devices in network environment 200 may include one or more devices 400 and/or one or more components of device 400.

Device 400 may include a bus 410, a processor 420, a memory 430, an input component 440, an output component 450, and a communication interface 460. Bus 410 may include a path that permits communication among the components of device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420. Input component 440 may include a mechanism that permits a user to input information to device 400, such as a keyboard, a keypad, a button, a switch, etc. Output component 450 may include a mechanism that outputs information to the user, such as a display, a speaker, one or more light emitting diodes (LEDs), etc.

Communication interface 460 may include a transceiver that enables device 400 to communicate with other devices and/or systems via wireless communications, wired communications, or a combination of wireless and wired communications. For example, communication interface 460 may include mechanisms for communicating with another device or system via a network. Communication interface 460 may include an antenna assembly for transmission and/or reception of RF signals. For example, communication interface 460 may include one or more antennas to transmit and/or receive RF signals over the air. Communication interface 460 may, for example, receive RF signals and transmit them over the air to mobile device 110/access network 220, and receive RF signals over the air from access network 220/mobile device 110. In one implementation, for example, communication interface 460 may communicate with a network and/or devices connected to a network. Alternatively or additionally, communication interface 460 may be a logical component that includes input and output ports, input and output systems, and/or other input and output components that facilitate the transmission of data to other devices.

Device 400 may perform certain operations in response to processor 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer components, additional components, different components, or differently arranged components than those depicted in FIG. 4. For example, device 400 may include one or more switch fabrics instead of, or in addition to, bus 410. Additionally, or alternatively, one or more components of device 400 may perform one or more tasks described as being performed by one or more other components of device 400.

Figure 5:
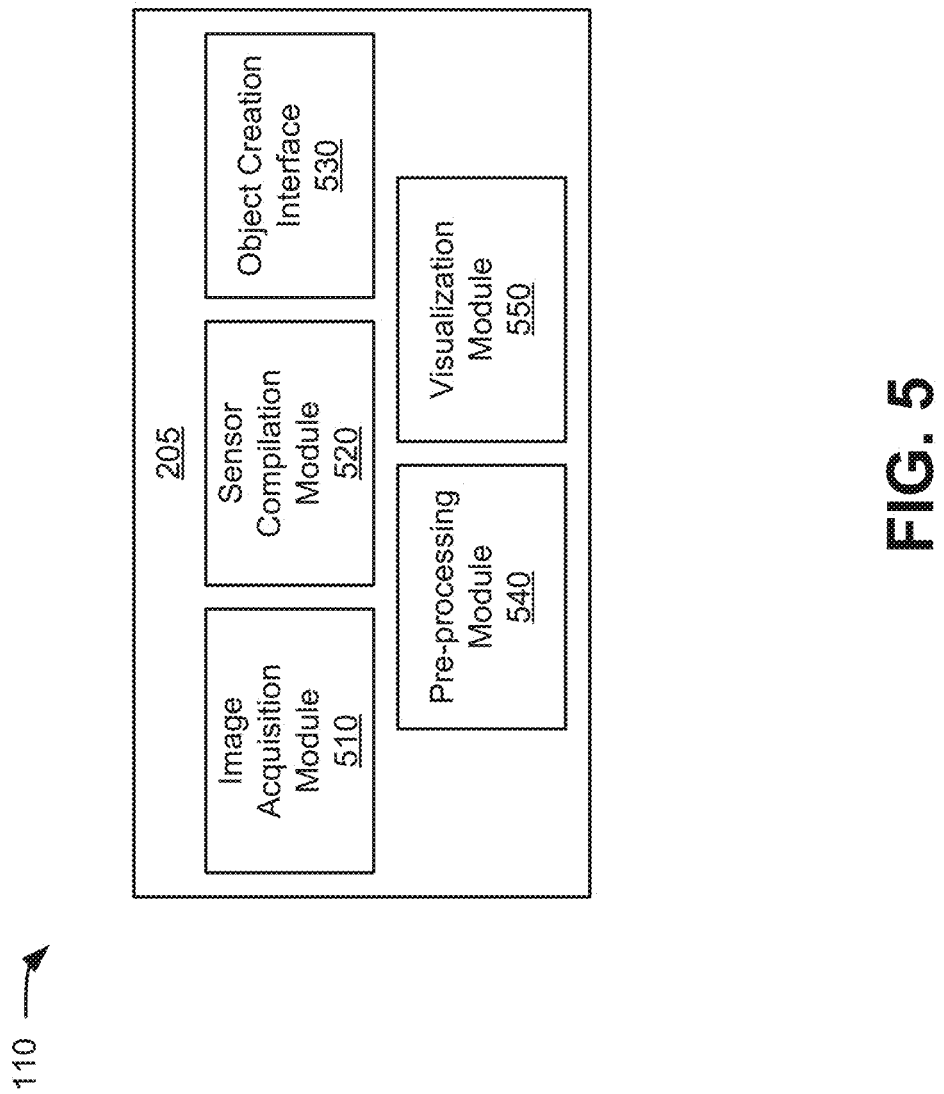
FIG. 5 is a block diagram illustrating exemplary functional components of the mobile device of FIG. 1.
Figure 6A:
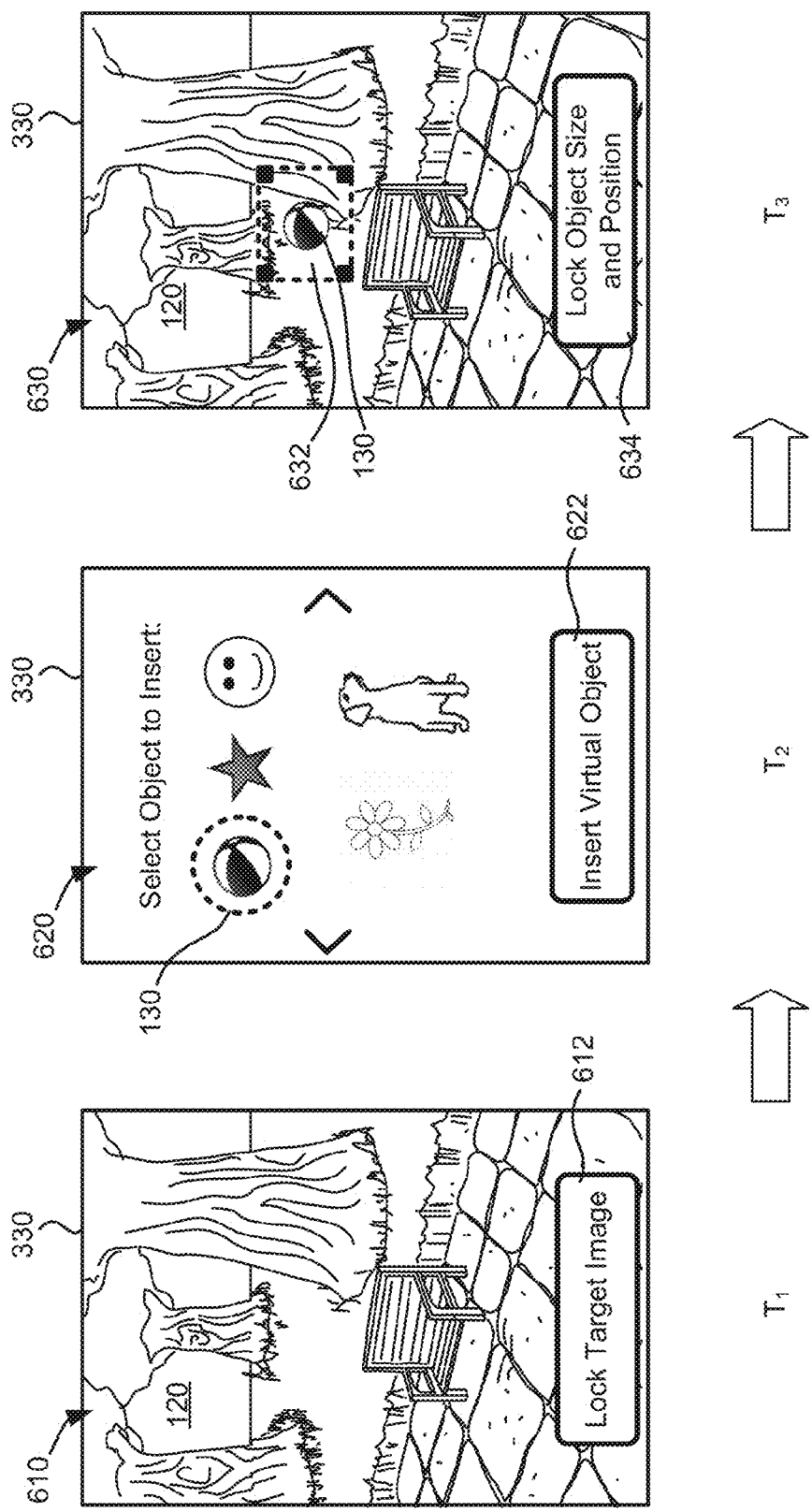
FIG. 6A is a diagram illustrating selection of a reference point for an augmented reality sphere and placement of a virtual object.
Figure 6B:
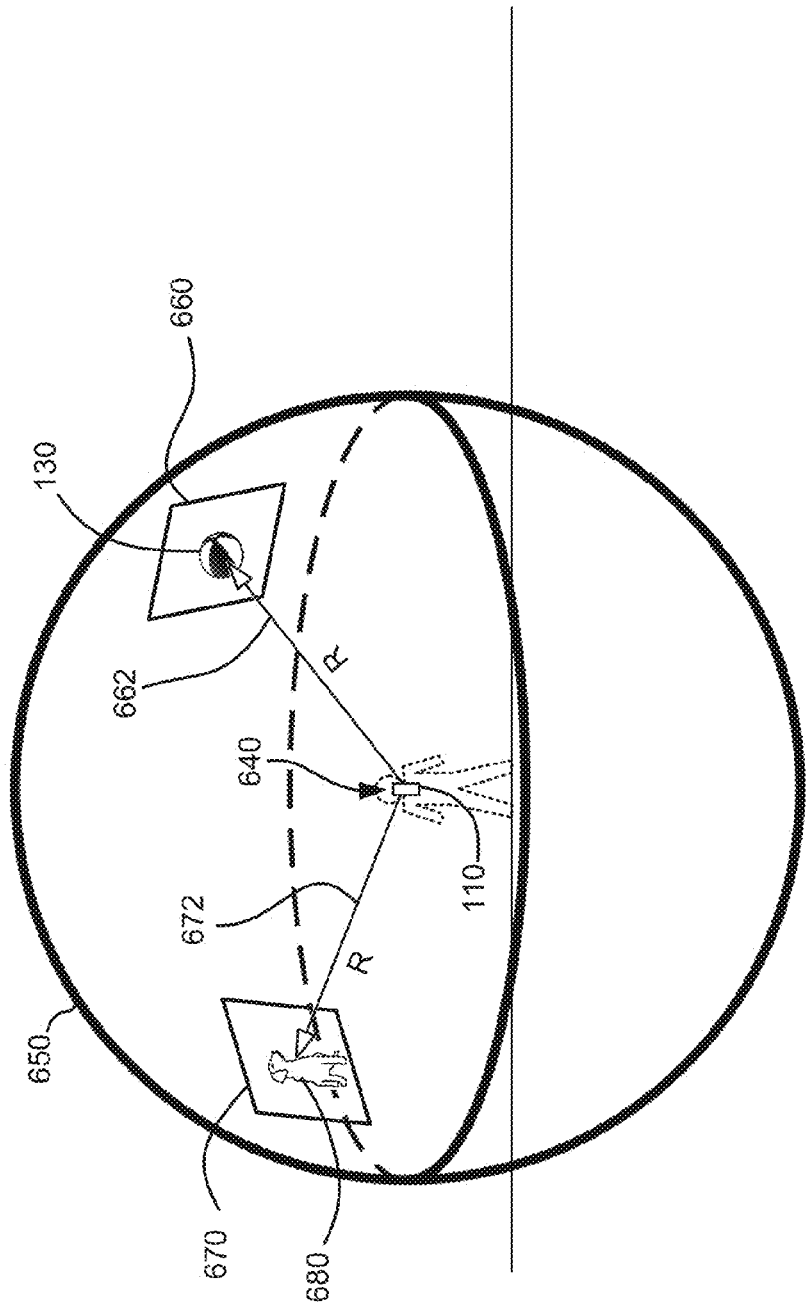
FIG. 6B is a diagram illustrating placement of multiple virtual objects within an augmented reality sphere, according to an implementation described herein.

FIG. 5 is a block diagram illustrating exemplary functional components of mobile device 110. As shown in FIG. 5, mobile device 110 may include AR application 205 with an image acquisition module 510, a sensor compilation module 520, an object creation interface 530, a pre-processing module 540, and a visualization module 550. FIGS. 6A and 6B are illustrations of display screen 330 when mobile device 110 is implementing certain features of AR application 205. Aspects of image acquisition module 510, sensor compilation module 520, object creation interface 530, pre-processing module 540, and visualization module 550 are described in conjunction with FIGS. 6A and 6B.

Image acquisition module 510 may collect images (e.g., frames of a video feed) from camera element 360 and present the images to a user via display screen 330. For example, as shown in FIG. 6A, a user may activate AR application 205 to acquire images via camera element 360. Mobile device 110 may present a continuous feed of images from camera element 360 on an image selection screen 610 with a lock target image button 612 (or another selection mechanism) to accept a user's selection. At a time $T_1$, when the user identifies a particular camera view that is desired for establishing a reference point for a virtual space, the user may select lock target image button 612 to acquire the current view as target image 120. Target image 120 will be used as a point of reference for an AR sphere, including unlocking the AR sphere to place virtual objects and unlocking the AR sphere for subsequent discovery of the virtual objects. According to implementations described herein, zoom functionality of camera element 360 would be disabled when AR application 205 is in use.

Sensor compilation module 520 may collect data about mobile device 110 contemporaneously to the acquisition of target image 120 and contemporaneously to the placement of virtual objects. For example, when the user selects lock target image button 612, sensor compilation module 520 may obtain data from sensors 370, location information from locator system 230, and/or other data. In one implementation, sensor compilation module 520 may collect a geographic location, a direction heading, and tilt angles (e.g., roll, pitch, and yaw) of mobile device 110 at the time target image 120 is selected (e.g., time $T_1$ of FIG. 6A).

Object creation interface 530 may allow a user to insert a virtual object into an AR sphere. In one implementation, object creation interface 530 may provide a user interface screen 620 to select a virtual object from a catalog of virtual objects. For example, as shown in FIG. 6A at time $T_2$, AR application 205 may present screen 620 with a group of virtual objects available for insertion into an AR sphere and an insert virtual object button 622 (or another selection mechanism). In one implementation, each virtual object may include (or be linked to) three-dimensional information to permit two-dimensional rendering of the virtual object from different orientations and perspectives (e.g., front, back, side, etc., of the virtual object). In another implementation, virtual objects available for selection may include peer-generated virtual objects which may be uploaded to a catalog of virtual objects using, for example, an application programming interfaces (API). The catalog of virtual objects may be provided to AR application 205, for example, from server 215. The user may select a particular virtual object (e.g., virtual object 130) from screen 620 and select the insert virtual object button 622 to add virtual object 130 into the AR sphere associated with the reference position.

Upon selection of insert virtual object button 622 at time $T_2$, object creation interface 530 may present a placement screen 630 with virtual object 130 within (or overlaid on) a video feed from the rear-facing camera (e.g., camera element 360) of mobile device 110. As shown in FIG. 6A at time $T_3$, placement screen 630 may present virtual object 130 with an editing box 632 to accept user input. In one implementation, a user may position virtual object 130/editing box 632 within placement screen 630 to overlay virtual object 130 on target image 120. In another implementation, virtual object 130/editing box 632 may be placed in the center of placement screen 630 and the user may move mobile device 110 to align virtual object 130/editing box 632 within the images of the video image. In one implementation, editing box 632 may include "handles" to allow a user to indicate a change in size, a rotation, or a change in three-dimensional perspective of virtual object 130. Once a user has positioned virtual object 130 with the desired size, position, and orientation, the user may select a lock object size and position button 634 to complete user input for insertion of virtual object 130. Sensor data from sensors 370 may be collected contemporaneously with the user's selection of lock object size and position button 634 to complete an object definition for virtual object 130. The virtual object definition may essentially allow virtual object to be attached to a portion of the AR sphere relative to the reference position of the AR sphere.

Based on the target image data for target image 120, object creation interface 530 may establish a reference position 640 for an AR sphere 650, as illustrated in FIG. 6B. Reference position 640 may correspond to the geo-location, directional heading, and tilt of mobile device 110 for viewing target image 120. AR sphere 650 may have a fixed radius, R, extending from reference position 640. In one implementation, radius R may include a default value (e.g., 15 feet, 30 feet, etc.) provided with AR application 205. In another implementation, radius R may be selected based on a size or type of virtual object 130. AR sphere 650 is a mathematical construct for use by AR application 205/server 215 and may not be seen by a user of mobile device 110.

Once a reference position is established for virtual object 130, virtual objects may be placed at any point along the surface of AR sphere 650 using, for example, object creation interface 530. A user may tilt and rotate mobile device 110 (e.g., while maintaining the same geo-location) to select another image for placing another virtual objects, such as virtual object 680, on AR sphere 650. Sensor compilation module 520 may collect data about mobile device 110 contemporaneous to the placement of virtual object 680 and relative to the reference position for AR sphere 650 (e.g., that corresponds to the target image data for target image 120). For example, in the illustration of FIG. 6B, sensor compilation module 520 may detect mobile device 110 rotating −100° (e.g., compass heading) and tilting −7° (e.g., gyroscope reading) relative to the target image data when the user selects a placement location for of virtual object 680. This second orientation of mobile device 110 may be associated with virtual object 680. In another implementation, a series of the same virtual objects may be placed at different locations within AR sphere 650 to simulate movement of the virtual object as a user changes the orientation of mobile device 110.

According to one aspect, each virtual object may be projected as a two-dimensional rendering on a plane that is tangential to AR sphere 650 at a location selected by a user of mobile device 110. For example, as shown in FIG. 6B, virtual object 130 may be a two-dimensional rendering at radius R within plane 660. Plane 660 may be tangential to AR sphere 650 and orthogonal to a line 662 that extends along radius R to a center of virtual object 130. Similarly, virtual object 680 may be a two-dimensional rendering at radius R within plane 670. Plane 670 may be tangential to AR sphere 650 and orthogonal to a line 672 that extends along radius R to a center of virtual object 680. As described above with respect to virtual object 130, a user of mobile device 110 may position virtual object 680 as a two-dimensional rendering with the desired size, position, and orientation within plane 670.

A collection of the target image 120, the target image data, AR sphere 650, and any virtual object definitions (e.g., for virtual objects 130, 680, etc.) may be referred to herein as an "AR space." Each AR space may be stored locally on mobile device 110 or in a memory associated with server 215 (e.g., for sharing with users of other mobile devices).

Pre-processing module 540 may assemble the target image 120, the corresponding sensor data from sensor compilation module 520, and the object definitions from object creation interface 530 into a data package. In one implementation, pre-processing module 540 may provide a data package for each virtual object placed by a user of mobile device 110. For example, pre-processing module 540 may provide a data package to server 215 for rendering of virtual object 130 within the selected plane (e.g., plane 660). At a later time, pre-processing module 540 may provide another data package to server 215 for rendering of virtual object 680 within the selected plane (e.g., plane 670). In another implementation, pre-processing module 540 may provide the target image 120, the corresponding sensor data from sensor compilation module 520, and the virtual object placement data from object creation interface 530 to server 215 separately (e.g., in real time as they are collected). In still another implementation, pre-processing module 540 may assemble and send a data package for an entire AR space.

Visualization module 550 may receive rendering information from server 215 and present virtual objects on display screen 330 of mobile device 110. When one of mobile devices 110-1 or 110-2 is identified at the reference position (e.g., reference position 640), visualization module 550 may receive rendering information for virtual object 130 (and virtual object 680) and present virtual objects 130/680 on mobile device 110-1 or 110-2 when the orientation of mobile device 110 corresponds to the object definition for the virtual object. For example, visualization module 550 may receive a match indication from server 215 that a combination of image, location data, and sensor data for mobile device 110-2 corresponds to a reference position and target image (a "virtual object trigger") created by mobile device 110-1. Visualization module 550 may then present virtual object 130 on mobile device 110-2 when mobile device 110-2 is aligned according to the object definition for virtual object 130 (which may or may not correspond to the reference position for AR sphere 650). When turning/tilting of mobile device 110-1 or 110-2 from the reference position to a secondary orientation (e.g., at a relative −100° of rotation and −7° of tilt, as described above) is detected, visualization module 550 may receive rendering information for virtual object 680 and present virtual object 680 on mobile device 110-1 or 110-2. In another implementation, rendering information for virtual object 680 may be provided when AR sphere 650 is unlocked by mobile device 110, such that the rendering of virtual object 680 may be shown coming into view from an edge of display screen 330 as mobile device 110-1 or 110-2 rotates into the position defined by the object definition of virtual object 680.

Although FIG. 5 shows exemplary components of mobile device 110, in other implementations, mobile device 110 may contain fewer components, additional components, or different components than those depicted in FIG. 5. For example, in one implementation, one version of AR application 205 may include components for virtual object presentation only, and another version of AR application 205 may include components for both placement and presentation of virtual objects. Additionally, or alternatively, one or more functions of mobile device 110 may be performed by (or in conjunction with) server device 215.

Figure 7:
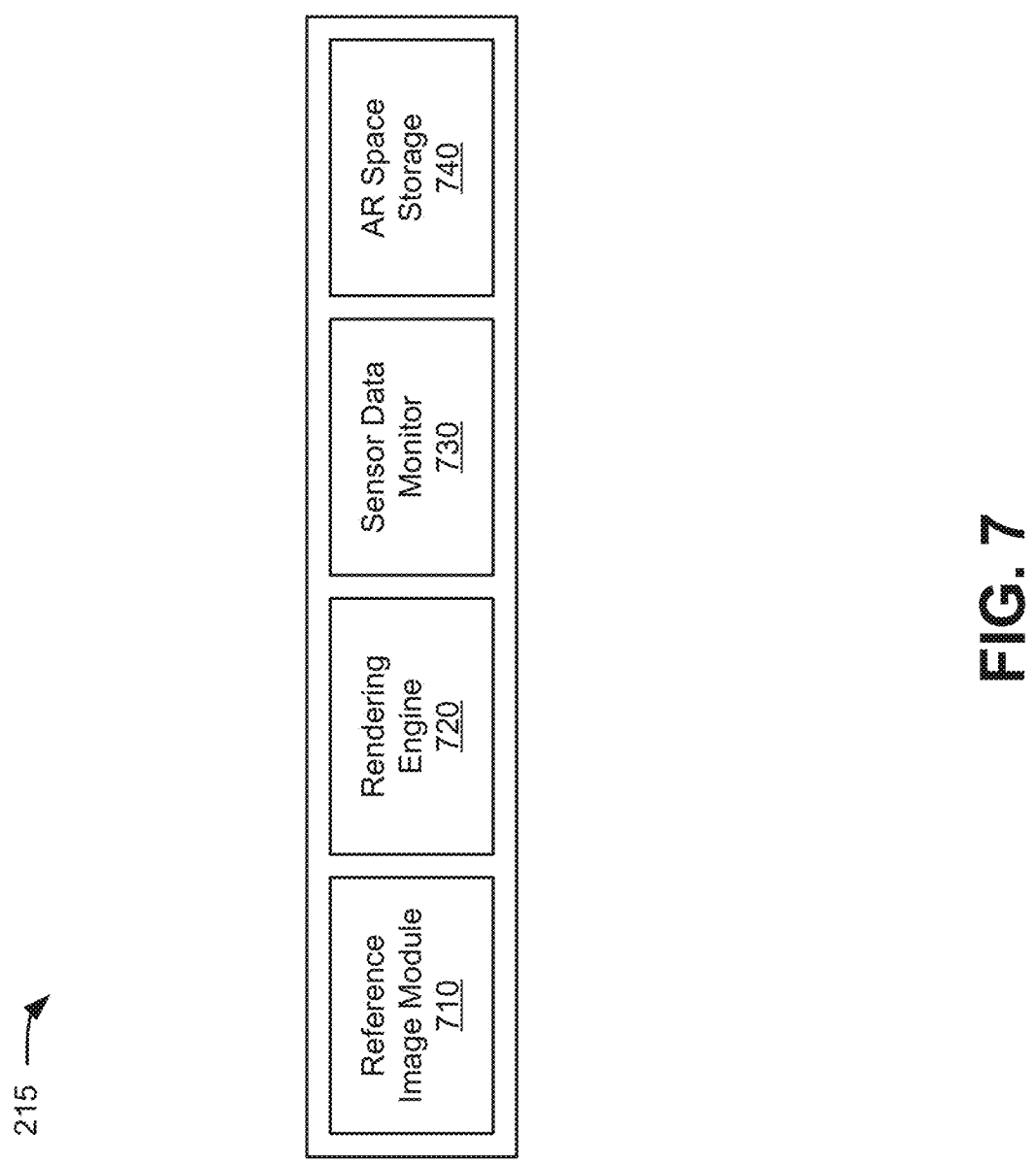
FIG. 7 is a block diagram illustrating exemplary functional components of the server device of FIG. 2.

FIG. 7 is a block diagram illustrating exemplary functional components of server device 215. As shown in FIG. 7, server device 215 may include a reference image module 710, a rendering engine 720, a sensor data monitor 730, and AR space storage 740.

Figure 8:
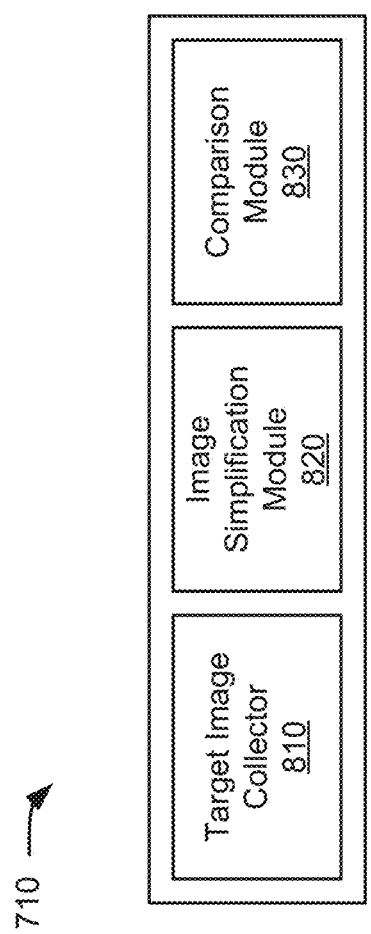
FIG. 8 is a block diagram illustrating exemplary functional components of the reference image module of FIG. 7.

Reference image module 710 may generally receive reference location information to define a reference point for a virtual object with an augmented reality service. Reference image module 710 may also compare subsequent images to identify a starting point of reference for subsequent discovery of the virtual object by other users. Additional details of reference image module 710 are described in connection with FIG. 8. As shown in FIG. 8, reference image module 710 may include a target image collector 810, an image simplification module 820, and a comparison module 830. Aspects of target image collector 810, image simplification module 820, and comparison module 830 are described in conjunction with FIGS. 9A and 9B.

Target image collector 810 may receive and store a target image and target image data from mobile device 110. The target image may provide a point of reference from which virtual objects (e.g., virtual object 130) may be placed relative to the reference position. Target image collector 810 may receive, for example, target image 120 and target image data. Target image data may include sensor data obtained by sensors 370 of mobile device 110 contemporaneously with the acquisition of target image 120. Target image data may also include geo-location data obtained, for example, by mobile device 110 from locator system 230.

Image simplification module 820 may identify key elements of target image 120 to simplify matching with subsequent images (e.g., from the same mobile device 110 or another mobile device 110). For example, image simplification module 820 may identify all or a limited number of edges in target image 120. Edge detection may be performed using edge detection software, such as the Edge Detection and Image Segmentation (EDISON) System. In one implementation, the number of edges used by image simplification module 820 may be based on, for example, a statistically significant number of edges likely to represent a unique image for given location (e.g., reference position 640, as indicated by particular geo-location coordinates, direction heading, and/or tilt). In another implementation, a set of "best" edges may be used based on length, continuity, connectivity, and/or clarity of the edges in target image 120. For example, image simplification module 820 may extract only straight edges for use in image matching, such that each of the edges may be presented in an angle-distance format. FIG. 9A provides an exemplary illustration of a simplified edge model 910 that image simplification module 820 may generate from target image 120 using edge extraction and only straight edges. In other implementations, different image recognition techniques may be used.

Comparison module 830 may receive images (e.g., video image sequences) from mobile device 110 (e.g., image acquisition module 510), along with geographic location and sensor data for mobile device 110. When comparison module 830 identifies that mobile device 110 is in the same geographic location and in a similar orientation to what is indicated in previously-stored target image data, comparison module 830 may apply the simplified edge model extracted from target image 120 (e.g., simplified edge model 910) to an incoming sequence of reality images. In one implementation, comparison module 830 may perform edge detection of the incoming reality images for comparison with simplified edge model 910. In another implementation, a different matching technique may be used to identify a match between an incoming reality image and target image 120. Comparison module 830 may provide a signal to rendering engine 720 when a match is identified. The signal may indicate, for example, that the mobile device 110 is in a reference position to trigger presentation of virtual objects (e.g., virtual object 130).

Figure 9B:
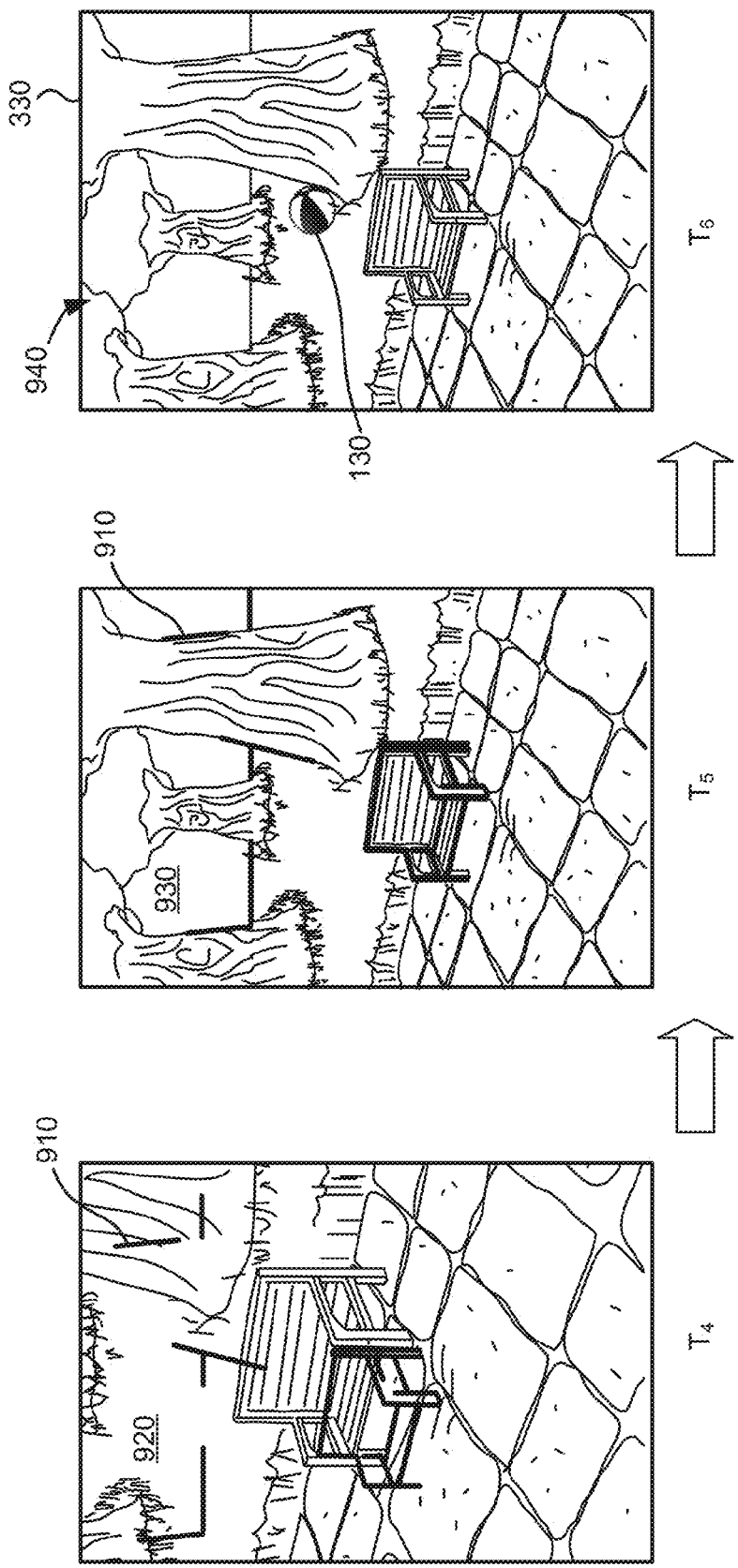

FIG. 9B provides an exemplary illustration of applying simplified edge model 910 to an incoming image sequence. A user may position mobile device 110 in the approximate geographic location and orientation of the reference position. As shown in FIG. 9B at time $T_4$, the geo-location and orientation of mobile device 110 may be close enough to the reference position to cause comparison module 830 to receive images from mobile device 110 and to apply simplified edge model 910. However, at time $T_4$, the user may be too close to the reference point such that an incoming image 920 from mobile device 110 would not correspond to simplified edge model 910. At time $T_5$, the user may step back and a subsequent image 920 from mobile device 110 may match simplified edge model 910. Although shown as a visual representation in FIG. 9B for illustration, in some implementations, comparison module 830 may perform matching calculations without presenting any visual representations.

Rendering engine 720 may receive a signal (e.g., from comparison module 830) to render a virtual object for presentation on mobile device 110. In one implementation, rendering engine 720 may provide instructions for presenting virtual object 130 on mobile device 110. The size, screen position, and orientation of virtual object 130 when mobile device 110 is in the reference position may correspond to the size, position, and orientation of virtual object 130 as originally provided to server 215 via object creation interface 530 (although virtual object 130 would only be visible when mobile device 110 is in the reference position if the object definition for virtual object 130 corresponds closely to the reference position). For example, referring to FIG. 9B, after an image match is detected at time $T_5$, rendering engine 720 may provide instructions for presenting virtual object 130 onto an image 940 of the current video feed at time $T_6$.

Once mobile device 110 is identified in a reference position (e.g., reference position 640) and an image match is detected (i.e., enabling an AR space 650 to be unlocked), rendering engine 720 may receive additional sensor data from mobile device 110 and apply the sensor data to initiate appropriate rendering of virtual objects (e.g., virtual objects 130/680) within the AR space for the target image (e.g., rendered on AR sphere 650). Thus, a compass direction change, tilt, rotation, etc. of mobile device 110 may be reported to rendering engine 720. Based on a comparison of incoming sensor data to the reference position, rendering engine 720 may detect a secondary orientation match for another virtual object (virtual object 680) and provide instructions for presenting virtual object 680 on mobile device 110.

Sensor data monitor 730 may receive sensor data from mobile device 110 (e.g., sensor compilation module 520 or pre-processing module 540). In some implementations, sensor data monitor 730 may receive different types of data from mobile device 110. For example, sensor data monitor 730 may receive location data only or no data when mobile device 110 is not at a geo-location corresponding to a reference position for an AR space. When mobile device 110 is at a geo-location corresponding to a reference position for an AR space, sensor data monitor 730 may receive real-time direction, tilt, and/or rotation data. Sensor data monitor 730 may compare data from mobile device 110 with stored reference positions and secondary orientations to detect when mobile device is within an AR space and when mobile device 110 is oriented to view a previously-defined virtual object. When sensor data monitor 730 identifies a match of mobile device 110 orientation and a stored position, sensor data monitor 730 may inform, for example, rendering engine 720.

AR space storage 740 may store AR space definitions (e.g., for AR spheres 650). Each AR space definition may include, for example, a target image 120, corresponding target image data, an AR sphere radius, and virtual object definitions (e.g., with virtual object placement data relative to the target image data). In one implementation, AR space definitions may also include corresponding simplified edge models. AR space definitions may also include a user list (or access requirements) of other users permitted to access a particular AR space. For example, AR space storage 740 may store AR space definitions from multiple users and store access instructions (e.g., private, public, etc.) for each AR space definition. In one implementation, at least some data fields from AR space storage 740 may be linked to an AR space catalog or listing that may be accessible by users of AR application 205.

Although FIG. 7 shows exemplary components of server 215, in other implementations, server 215 may contain fewer components, additional components, or different components than those depicted in FIG. 7. For example, while the functional components of FIG. 7 are shown in connection with server device 215, in some implementations one or more functions described herein may be performed by another device, such a mobile device 110 or another device within service provider network 210.

Figure 10:
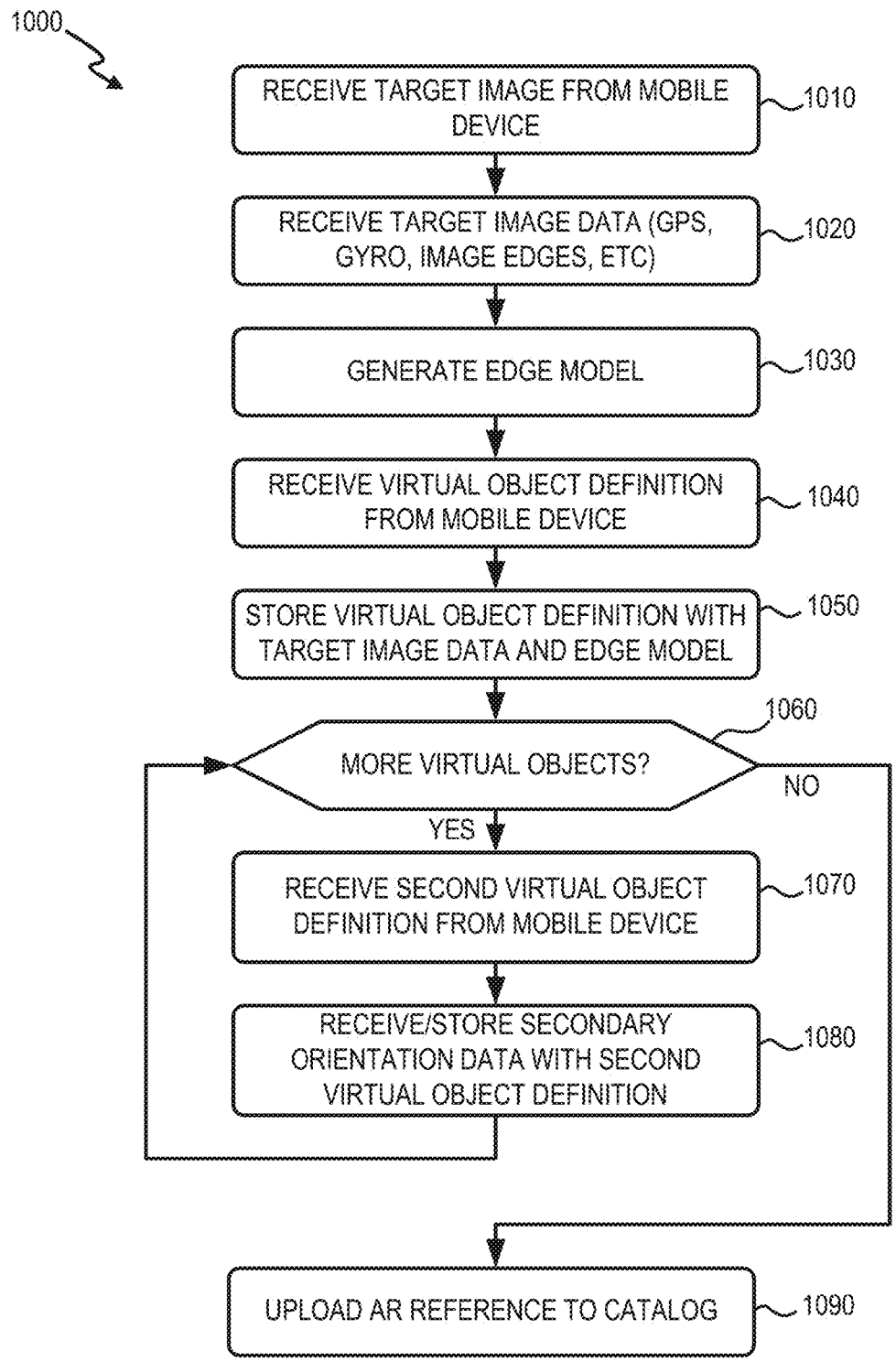
FIG. 10 is a flow diagram that illustrates an exemplary process for placing a virtual object, according to an implementation described herein.

FIG. 10 is a flow diagram illustrating an exemplary process 1000 for placing virtual objects in an augmented reality space. In one implementation, process 1000 may be implemented by server 215. In another implementation, process 1000 may be implemented by server 215 in conjunction with one or more other devices in network environment 200, such as mobile devices 110.

Referring to FIG. 10, process 1000 may include receiving a target image from a mobile device (block 1010) and receiving target image data (block 1020). For example, as described above in connection with FIGS. 5-7, application 205 (e.g., image acquisition module 510) on mobile device 110 may collect a target image selected by a user and provide the target image to server 215. Server 215 may receive the target image and store the target image in association with other data from application 205. Application 205 (e.g., sensor compilation module 520) may collect data about mobile device 110 contemporaneously with the acquisition of target image 120. The collected data may include a direction heading, tilt, geo-location, etc. associated with the time target image 120 was captured. Application 205 may forward the collected data as target image data, which may be received by server 215.

Process 1000 may also include generating an edge model from the target image (block 1030). For example, as described above, image simplification module 820 of server 215 may identify key elements of target image 120 to simplify matching with subsequent images. In one implementation, image simplification module 820 may identify a limited number of edges in target image 120 to use for matching.

Process 1000 may further include receiving a virtual object definition from the mobile device (block 1040), and storing the virtual object definition with the target image data and the edge model (block 1050). For example, a user may use the object creation interface 530 from application 205 to insert a virtual object into the AR sphere (AR sphere 650). The user may position virtual object 130 with a desired size, virtual location, and orientation to lock in the virtual object definition. Application 205 may send the virtual object definition to server 215, and server 215 may store the object definition in association with other data from application 205 for the AR space (such as the target image and the target image data). Server 215 may store target image 120, the target image data, and the virtual object definition together as an AR data set for the AR space.

Process 1000 may further include determining if more virtual objects are being added to the AR data set (block 1060). For example, as described in connection with FIG. 6B, a user of mobile device 110 may add additional virtual objects within AR sphere 650 by tracking an orientation of mobile device 110 against the original reference position. If a user elects to insert additional virtual objects, application 205 may forward additional information to server 215.

If more virtual objects are being added to the AR data set (block 1060—YES), process 1000 may include receiving a second virtual object definition from the mobile device (block 1070) and receiving and storing secondary orientation data with the second virtual object definition (block 1080). For example, using object creation interface 530 a user may rotate and place select another location to place a second virtual object (e.g., virtual object 680). The user may adjust the size and orientation of the second virtual image and lock the second virtual image to create a second virtual image definition within AR sphere 650. Sensor compilation module 520 may collect data about mobile device 110 contemporaneously with the placement of virtual object 680 and relative to the target image data for target image 120. This second orientation of mobile device 110 may be associated with virtual object 680. Application 205 may send the second virtual object definition and the secondary orientation data to server 215.

If no more virtual objects are being added to the AR data set (block 1060—NO), server 215 may upload an augmented reality reference to a catalog (block 1090). For example, after a user has created one or more objects within AR sphere 650, server 215 may provide reference of the AR space in a list or catalog for other users to access. In one implementation, the augmented reality space may be accessible to any user of application 205 (e.g., using any mobile device 110). In another implementation, the augmented reality space may be included within a private listing for particular users (such as particular contacts identified by the creator of the augmented reality space).

Figure 11:
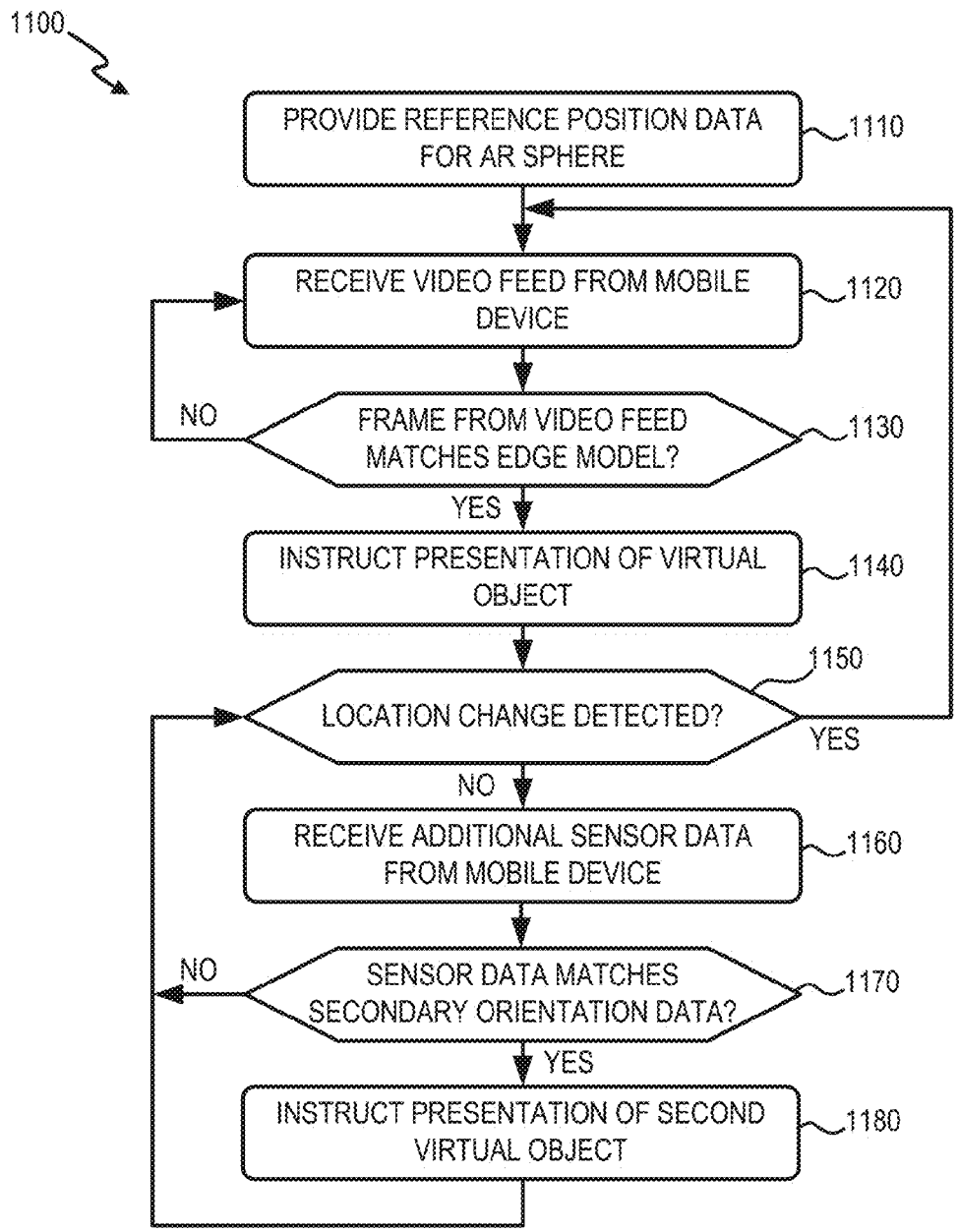
FIG. 11 is a flow diagram that illustrates an exemplary process for presenting a virtual object, according to an implementation described herein.

FIG. 11 is a flow diagram illustrating an exemplary process 1100 for presenting virtual objects in an augmented reality space. In one implementation, process 1100 may be implemented by server 215. In another implementation, process 1100 may be implemented by server 215 in conjunction with one or more other devices in network environment 200, such as mobile devices 110. In one implementation, process 1100 may be used to present, on a mobile device 110, a virtual object previously placed in virtual space by a different mobile device 110.

Referring to FIG. 11, process 1100 may include providing reference position data, for an AR sphere, to an AR application (block 1110). For example, server 215 may receive a request from AR application 205-2 (on mobile device 110-2) for coordinates of AR sphere 650 previously generated by AR application 205-1 (e.g., using steps of process flow 1000 above). For example, AR application 205-2 may request information for an AR space previously stored with AR space storage 740. Server 215 may provide coordinates (e.g., particular geo-location coordinates, direction heading, and/or tilt from target image data) of a reference position (e.g., reference position 640) to AR application 205-2. In another implementation, server 215 may publish coordinates of AR spaces in a listing that may be accessible to AR application 205-2.

Process 1100 may include receiving a video feed from the mobile device (block 1120), and determining if a frame from the video feed matches an edge model of the target image for the AR sphere (block 1130). For example, once application 205-2 detects that mobile device 110-2 is in reference position 640, image acquisition module 510 may begin to feed video images to server 215. Server 215 (e.g., comparison module 830) may receive the video images to apply a simplified edge model (e.g., simplified edge model 910) to determine a match.

If a frame from the video feed does not match the edge model (block 1130—NO), then process 1100 may return to block 1120 to continuing receiving a video feed from the mobile device. If a frame from the video feed matches the edge model (block 1130—YES), process 1100 may include instructing presentation of a virtual object (block 1140). For example, referring to FIG. 9B, after an image match is detected at time $T_5$, rendering engine 720 of server 215 may provide instructions for mobile device 110-2 to present virtual object 130 onto image 930.

Process 1100 may also include detecting if there is a location change of the mobile device (block 1150). For example, mobile device 110-2 may simply stop providing coordinates or send a termination signal to server 215 when AR application 205-2 detects that mobile device 110-2 is no longer in the same geo-location as reference position 640. Alternatively, server 215 may receive geo-location information from AR application 205-2 and detect that mobile device 110-2 has moved from the geo-location coordinates for reference position 640.

If there is a location change of the mobile device (block 1150—YES), then process 1100 may return to block 1120 to continuing receiving a video feed from the mobile device. If there is not a location change of the mobile device (block 1150—NO), process 1100 may include receiving additional sensor data from the mobile device (block 1160), and determining if the addition sensor data matches secondary orientation data (block 1170). For example, assuming mobile device 110-2 stays at the geo-location coordinates of reference position 640, AR application 205-2 may provide sensor data to server 215, tracking the rotation and/or tilt of mobile device 110-2. Server 215 (e.g., sensor data monitor 730) may monitor the incoming data for a match of any secondary orientation data within AR sphere 650, such as the secondary orientation data for virtual object 680.

If the additional sensor data does not match any secondary orientation data (block 1170—NO), process 1100 may return to process block 1150. If the addition sensor data matches secondary orientation data (block 1170—YES), process 1100 may include instructing presentation of a second virtual object (block 1180). For example, after sensor data match is detected, rendering engine 720 of server 215 may provide instructions for mobile device 110-2 to present a second virtual object (e.g., virtual object 680) in accordance with size, position, and orientation in the second virtual object definition.

Systems and methods described herein may allow for placement and presentation of virtual objects using mobile devices with a single camera lens. A device may receive, from a first mobile device, a target image captured from a camera and target image data collected contemporaneously with the target image. The target image data may include a geographic location, a direction heading, and a tilt. The device may receive, from the first mobile device, a first virtual object definition that includes an object type, a size, and a mobile device orientation for presenting a first virtual object within a video feed. The device may generate a simplified model of the target image, and may store the first virtual object definition associated with the target image data and the simplified model of the target image. The device may upload the first virtual object definition and the target image data, so that the first virtual object is discoverable by a second mobile device.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 10 and 11, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a computing device, the method comprising:
    receiving, from a first mobile device, a target image captured from a camera;
    receiving, from the first mobile device, target image data collected contemporaneously with the target image, wherein the target image data defines a reference position that includes a geo-location, a direction heading, and a tilt for the first mobile device;
    generating a simplified model of the target image;
    receiving, from the first mobile device, a first virtual object definition that includes an object type, an object size, and a mobile device orientation for presenting a first virtual object within a video feed;
    storing, based on the receiving the first virtual object definition, an augmented reality (AR) sphere that includes a sphere radius extending from the reference position, the first virtual object definition associated with the reference position and the simplified model of the target image;
    uploading, to a memory location accessible to other mobile devices, the AR sphere;
    sending, to a second mobile device, coordinates of the reference position for the AR sphere;
    receiving, from the second mobile device, an indication that the second mobile device is in the reference position;
    receiving, from the second mobile device, a video feed while the second mobile device is in the reference position;
    detecting a match between an image from the video feed and the simplified model;
    unlocking the AR sphere for the second mobile device based on the detecting; and
    instructing the second mobile device to present the first virtual object over the image when the match is detected and the AR sphere is unlocked.

2. The method of claim 1, further comprising:
    providing, to the first mobile device, an augmented reality application that includes a user interface to enable a user to provide the first virtual object definition.

3. The method of claim 1, wherein the mobile device orientation includes a different direction heading and a different tilt of the mobile device that is collected contemporaneously with a user's placement of the first virtual object.

4. The method of claim 1, wherein the first virtual object is a two-dimensional representation of a three-dimensional object.

5. The method of claim 1, wherein the generating further comprises:
    detecting multiple edges in the target image;
    selecting a statistically significant number of edges from the multiple edges; and
    storing the selected edges as the simplified model.

6. The method of claim 1, further comprising:
    receiving, from the first mobile device, another virtual object definition that includes an object type and a size of another virtual object;
    receiving, from the first mobile device, other mobile device data collected contemporaneously with placement of the other virtual object, wherein the other mobile device data includes the geo-location, a different direction heading, and a different tilt; and
    storing, associated with the AR sphere, the other mobile device data and the other virtual object definition.

7. The method of claim 1, further comprising:
    receiving, from the first mobile device, another virtual object definition that includes an object type and a size of another virtual object;
    receiving, from the first mobile device, other mobile device data collected contemporaneously with placement of the other virtual object, wherein the other mobile device data includes the geo-location, a different direction heading, and a different tilt;
    storing, with the AR sphere, the other mobile device data associated with the other virtual object definition;
    receiving, from the second mobile device, an indication that the second mobile device is in a position that corresponds to the other mobile device data; and
    instructing the second mobile device to present the other virtual object over the image in response to the indication that the second mobile device is in the position that corresponds to the other mobile device data.

8. The method of claim 7, further comprising:
providing, to the second mobile device, an augmented reality application that includes a user interface to enable the second mobile device to obtain the first virtual object definition.

9. The method of claim 1, wherein the first mobile device includes a single camera facing an opposite direction to a display screen, and wherein the computing device includes a server device for a service provider network.

10. A device comprising:
one or more memories to store instructions; and
one or more processors to execute the instructions to:
receive, from a first mobile device, a target image captured from a camera;
receive, from the first mobile device, target image data collected contemporaneously with the target image, wherein the target image data defines a reference position that includes a geo-location, a direction heading, and a tilt for the first mobile device;
generate a simplified model of the target image;
receive, from the first mobile device, a first virtual object definition that includes an object type, an object size, and a mobile device orientation for presenting a first virtual object within a video feed;
store, based on receiving the first virtual object definition, an augmented reality (AR) sphere that includes a sphere radius extending from the reference position, the first virtual object definition associated with the reference position and the simplified model of the target image;
upload, to a memory location accessible to other mobile devices, the AR sphere;
send, to a second mobile device, coordinates of the reference position for the AR sphere;
receive, from the second mobile device, an indication that the second mobile device is in the reference position;
receive, from the second mobile device, a video feed while the second mobile device is in the reference position;
detect a match between an image from the video feed and the simplified model;
unlock the AR sphere for the second mobile device based on the detecting; and
instruct the second mobile device to present the first virtual object over the image when the match is detected and the AR sphere is unlocked.

11. The device of claim 10, wherein the one or more processors are further to execute the instructions to:
provide, to the first mobile device, an augmented reality application that includes a user interface to enable a user to provide the first virtual object definition, and wherein the user interface provides access to a catalog of virtual objects.

12. The device of claim 10, wherein the first virtual object definition further includes an orientation for a two-dimensional rendering of the first virtual object.

13. The device of claim 10, wherein, when generating the simplified model of the target image, the one or more processors are further to execute the instructions to:
detect multiple edges in the target image;
select a group of edges from the multiple edges; and
store the selected group of edges as the simplified model.

14. The device of claim 10, wherein, when detecting the match between the image from the video feed and the simplified model, the one or more processors are further to execute the instructions to:

detect edges in the image from the video feed; and
compare the edges in the image from the video feed with the selected group of edges in the simplified model.

15. The device of claim 10, wherein the one or more processors are further to execute the instructions to:
receive, from the first mobile device, another virtual object definition that includes an object type and a size of another virtual object;
receive, from the first mobile device, other mobile device data collected contemporaneously with placement of the other virtual object, wherein the other mobile device data includes the geo-location, a different direction heading, and a different tilt; and
store the other virtual object and the other mobile device data and the target image data associated with the AR sphere.

16. A non-transitory computer-readable medium containing instructions executable by at least one processor, the computer-readable medium comprising one or more instructions to:
receive, from a first mobile device, a target image captured from a camera;
receive, from the first mobile device, target image data collected contemporaneously with the target image, wherein the target image data defines a reference position that includes a geo-location, a direction heading, and a tilt for the first mobile device;
generate a simplified model of the target image;
receive, from the first mobile device, a first virtual object definition that includes an object type, an object size, and a mobile device orientation for presenting a first virtual object within a video feed;
store, based on receiving the first virtual object definition, an augmented reality (AR) sphere that includes a sphere radius extending from the reference position, the first virtual object definition associated with the reference position and the simplified model of the target image;
upload, to a memory location accessible to other mobile devices, the AR sphere;
send, to a second mobile device, coordinates of the reference position for the AR sphere;
receive, from the second mobile device, an indication that the second mobile device is in the reference position;
receive, from the second mobile device, a video feed while the second mobile device is in the reference position;
detect a match between an image from the video feed and the simplified model;
unlock the AR sphere for the second mobile device based on the detecting; and
instruct the second mobile device to present the first virtual object over the image when the match is detected and the AR sphere is unlocked.

17. The non-transitory computer-readable medium claim 16, further comprising one or more instructions to:
provide, to the first mobile device, an augmented reality application that includes a user interface to enable a user to provide the first virtual object definition, and wherein the user interface provides access to a catalog of virtual objects; and
provide, to the second mobile device, an augmented reality application that includes a user interface to enable the second mobile device to obtain the first virtual object definition.

* * * * *